(12) United States Patent
Champagne

(10) Patent No.: US 7,933,700 B2
(45) Date of Patent: Apr. 26, 2011

(54) METHODS AND SYSTEMS FOR END OF TRAVEL HARSHNESS REDUCTION

(75) Inventor: Anthony J. Champagne, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 0 days.

(21) Appl. No.: 12/713,466

(22) Filed: Feb. 26, 2010

(65) Prior Publication Data

US 2011/0010049 A1    Jan. 13, 2011

Related U.S. Application Data

(63) Continuation of application No. 12/499,527, filed on Jul. 8, 2009.

(51) Int. Cl.
*B62D 5/04*    (2006.01)

(52) U.S. Cl. .......................................... 701/41; 180/443
(58) Field of Classification Search .................. None
See application file for complete search history.

(56) References Cited

U.S. PATENT DOCUMENTS

| 4,574,905 A | * | 3/1986 | Asano et al. ................. 180/422 |
| 4,685,528 A | * | 8/1987 | Suzuki et al. ................ 180/446 |
| 6,408,235 B1 | | 6/2002 | Tanke, II et al. | |

\* cited by examiner

*Primary Examiner* — Michael J. Zanelli
(74) *Attorney, Agent, or Firm* — Cantor Colburn LLP

(57) ABSTRACT

A control system for controlling a steering system is provided. The control system includes a first module that selectively determines a gain curve based on a position of a hand wheel of the steering system. A second module determines a motor assist command based on the gain curve.

17 Claims, 6 Drawing Sheets

METHODS AND SYSTEMS FOR END OF TRAVEL HARSHNESS REDUCTION

CROSS-REFERENCES TO RELATED APPLICATIONS

This patent application is a continuation of and claims priority to U.S. patent application Ser. No. 12/499,527, filed Jul. 8, 2009 which is incorporated herein by reference in its entirety.

FIELD

The present disclosure relates to methods and system for controlling a steering system, and more particularly to methods and system for reducing end of travel harshness in a steering system.

BACKGROUND

The subjective impression of vehicle steering systems can be influenced by system behavior at the end of travel. A negative impression can occur if there is a harsh, abrupt feeling when steering into the corners. In some applications, a metal-on-metal clunk due to the steering rack end of travel hardware causes both audible and tactile annoyances.

In present applications, the end-of-travel feel is influenced primarily by the rack-and-pinion travel stop compliance. If a deficiency in the subjective impression is found at end-of-travel, cost and/or timing may prohibit finding a solution through changes to the rack and pinion travel stops.

SUMMARY

Accordingly, a control system for a steering system is provided. The control system includes a first module that selectively determines a gain curve based on a position of a hand wheel of the steering system. A second module determines a motor assist command based on the gain curve.

These and other advantages and features will become more apparent from the following description taken in conjunction with the drawings.

BRIEF DESCRIPTION OF THE DRAWINGS

The subject matter, which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
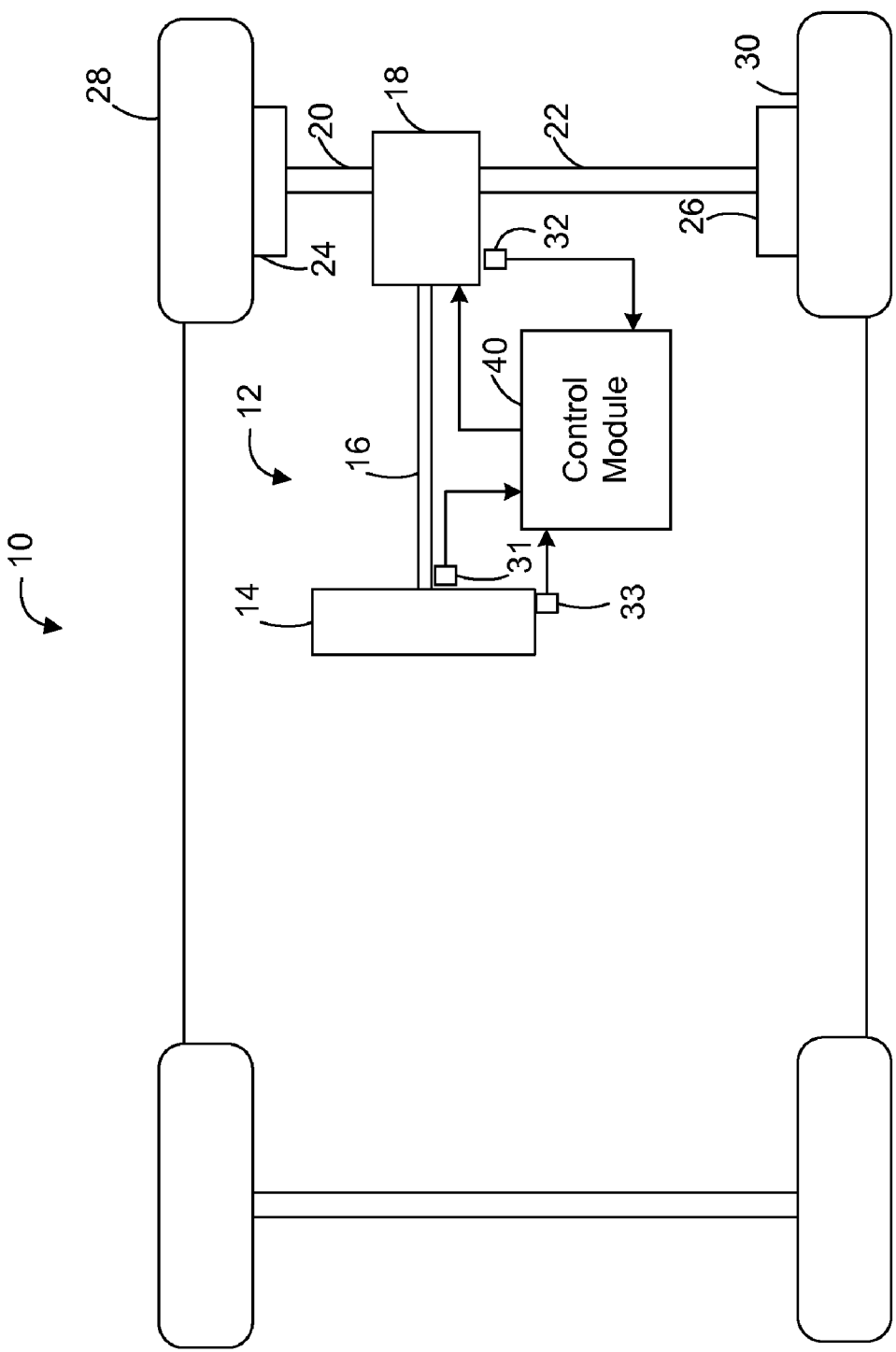
FIG. 1 is a functional block diagram illustrating a vehicle including a steering control system in accordance with the invention.

The following description is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, a vehicle 10 including a steering system 12 is illustrated. In various embodiments, the steering system 12 includes a hand wheel 14 coupled to a steering shaft 16. In one embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses the torque applied to the hand wheel 14 by the operator of the vehicle 10. The torque sensor generates a driver torque signal based thereon. In another example, the sensor 32 is a motor speed sensor that senses a rotational speed of the motor of the steering assist unit. The sensor 32 generates a motor speed signal based thereon. In yet another example, the sensor 33 is a hand wheel position sensor that senses a position of the hand wheel. The sensor 33 generates a hand wheel position signal based thereon.

A control module 40 controls the operation of the steering system 12 based on one or more of the sensor signals and further based on the steering control systems and methods of the present disclosure. Generally speaking, the steering control systems and methods of the present disclosure generate a final assist command to the motor of the steering assist unit 18 to control the end of travel harshness. In various embodiments, the steering control systems and methods apply a command adjust value such as a gain and/or a damping to the final assist command to reduce the end of travel harshness.

Figure 2A:
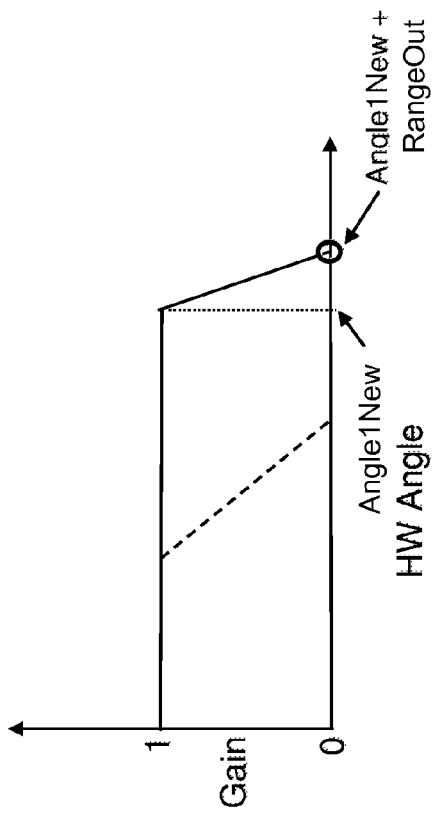
FIGS. 2A-2C are graphs illustrating a gain value of the steering control system in accordance with the invention.
Figure 2B:
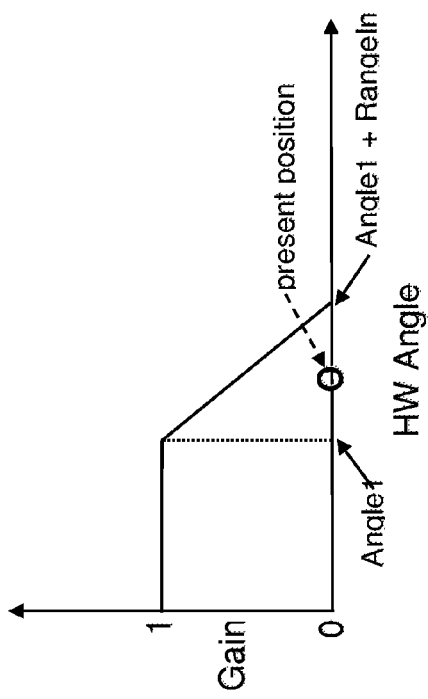
Figure 2C:
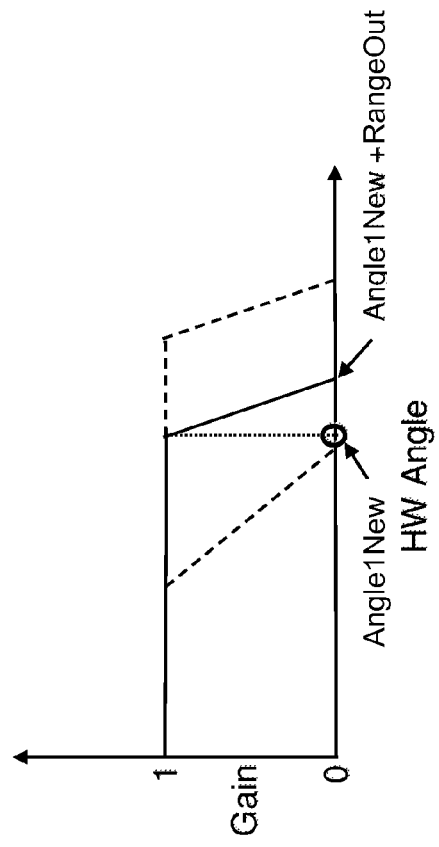

In various embodiments, the application of the gain varies depending on whether the steering system 12 (FIG. 1) is entering an end of travel region, exiting the end of travel region, and/or operating within the end of travel region. For example, as shown in FIG. 2A, when initially entering the end of travel region, the gain is scaled to zero as a function of hand wheel position based on a first gain curve. The first gain curve is defined by the predetermined values Angle1 and RangeIn. As shown in FIG. 2B, when operating within the end of travel region, the gain remains zero. However, a second gain curve is defined in preparation for exiting the end of travel region. The second gain curve is defined by the value of Angle1 new and the predetermined value RangeOut. As shown in FIG. 2C, when exiting the end of travel region, the value of Angle1 new is continually updated to adjust the gain curve.

Figure 3:
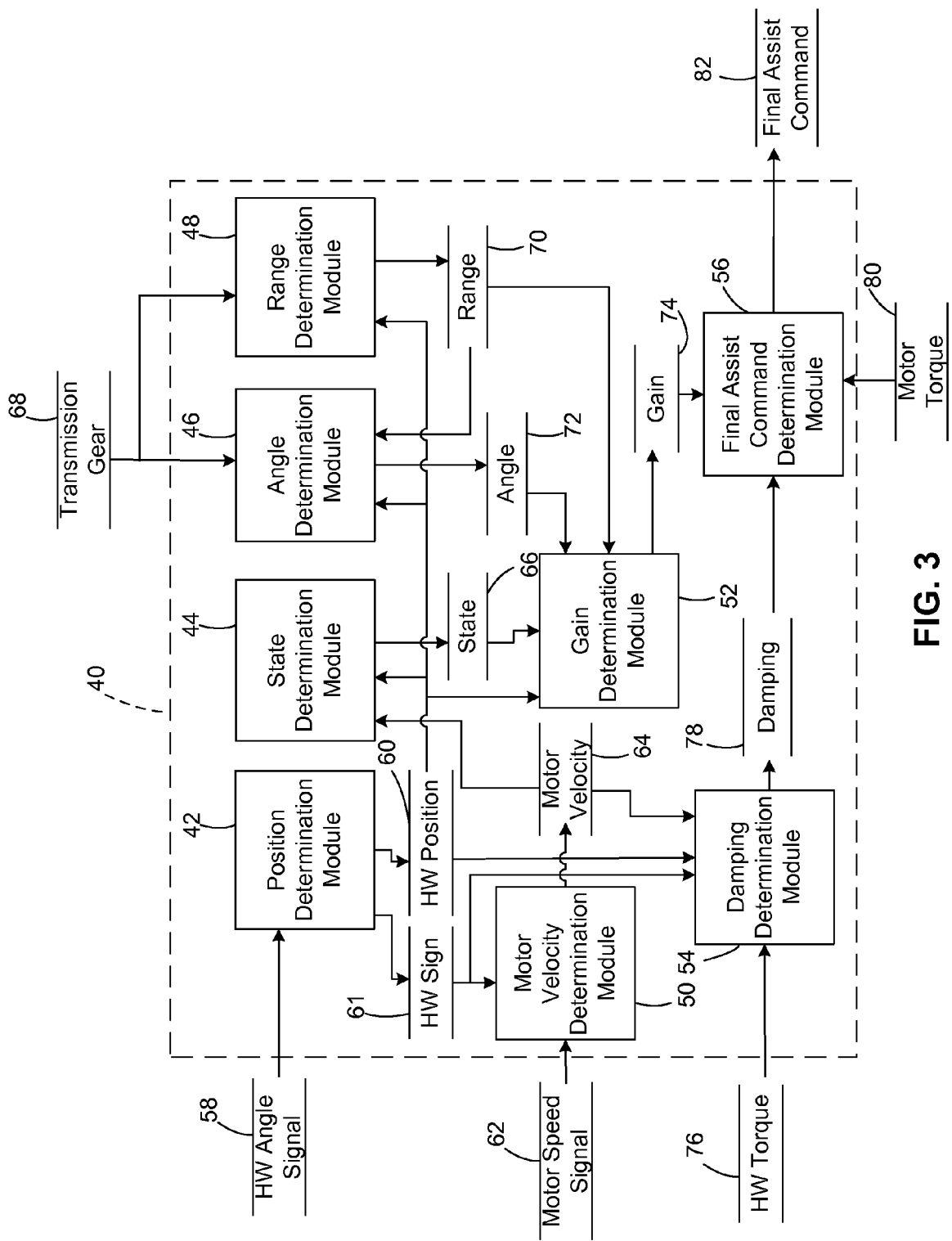
FIG. 3 is a dataflow diagram illustrating a steering control system in accordance with the invention.

Referring now to FIG. 3, a dataflow diagram illustrates embodiments of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate the final assist command 82 to the steering system 12 (FIG. 1) to reduce the end of travel harshness. Inputs to the control module 40 can be generated from the sensors 31, 32, 33 (FIG. 1) of the vehicle 10 (FIG. 1), can be received from other control modules (not shown) within the vehicle 10 (FIG. 1), can be modeled, and/or can be predefined.

In one example, the control module 40 includes a position determination module 42, a state determination module 44, an angle determination module 46, a range determination module 48, a motor velocity determination module 50, a gain determination module 52, a damping determination module 54, and a final assist command determination module 56.

The position determination module 42 receives as input a hand wheel angle signal 58. The position determination module 42 conditions the hand wheel angle signal 58 and generates the hand wheel position 60. The position determination module 42 conditions the hand wheel angle signal 58 using a low pass filter. In various embodiments, a corner frequency of the low pass filter can be predefined. In various embodiments, the position determination module 42 determines an absolute value of the hand wheel angle signal 58 prior to applying the low pass filter. As can be appreciated, in alternative embodiments, the absolute value can be determined by the position determination module 42 after applying the low pass filter to the hand wheel angle signal 58. In addition, the position determination module 42 determines a hand wheel position sign 61 of the hand wheel angle signal 58 to indicate a direction.

The motor velocity determination module 50 receives as input a motor speed signal 62, and the sign 61. The motor velocity determination module 50 similarly conditions the motor speed signal 62 to generate the motor velocity 64. For example, the motor velocity determination module 50 conditions the motor speed signal 62 using a low pass filter. The sign 61 can be used to invert the motor velocity 64 for negative angles.

The state determination module 44 receives as input the hand wheel position 60, the hand wheel sign 61, and the motor velocity 64. Based on the inputs, the state determination module 44 determines a hand wheel state 66 based on whether the steering system 12 (FIG. 1) is entering an end of travel region, holding within the region, or exiting the region. Table 1 summarizes conditions for each state 66.

TABLE 1

| Condition | Hand wheel Position | State |
|---|---|---|
| Enter Region | HW Position Greater than Angle1 AND Motor Velocity Greater than VelTrans | 2 |
| Hold Within Region | HW Position Greater than Angle1 AND Motor Velocity Greater than −VelTrans AND Motor Velocity Less than +VelTrans | 3 |
| Exit Region | HW Position Greater than Angle1 AND Motor Velocity Less than −VelTrans | 4 |
| Outside Region | HW Position Less than Angle 1 | 1 |

As shown in Table 1, state "2" corresponds to the state of entering the end of travel region. To be in this state, the hand wheel position 60 exceeds the predetermined threshold Angle1 and the motor velocity 64 is greater than the predetermined positive of the threshold VelTrans. State "3" corresponds to the state of holding within the region. To be in this state, the hand wheel position 60 exceeds the predetermined threshold Angle1, and the motor velocity 64 is greater than the predetermined negative of the threshold VelTrans and less than the predetermined positive of the threshold VelTrans.

State "4" corresponds to the state of exiting the region. To be in the exiting the region state, the hand wheel position 60 exceeds the predetermined threshold Angle1, and the motor velocity 64 is less than the predetermined negative of the threshold VelTrans. State "1" corresponds to the state if outside of the region (a normal condition). To be in the outside the region state, the hand wheel position 60 is less than the predetermined threshold Angle1.

The range determination module 48 receives as input the hand wheel position 60, and a transmission gear 68. In various embodiments, the transmission gear 68 can be received from a powertrain control module and can indicate the current gear of the vehicle transmission, for example, forward gears (e.g., first gear, second gear, third gear, etc.) and a reverse gear. The range determination module 48 determines a hand wheel range value 70 to apply when entering or exiting the end of travel region. For example, the range determination module 48 determines whether the range 70 should be set to a predetermined value of RangeIn or RangeOut. Table 2 summarizes exemplary conditions for determining the range 70.

TABLE 2

| Update Condition | Evaluation | Range Update |
|---|---|---|
| Normal Operation, Reset Range | HW Position < Angle1 | RangeIn |
| Change Range | HW Position > Angle1 + RangeIn | RangeOut |

As shown in Table 2, when the hand wheel position 60 is less than the predetermined threshold Angle1, the range 70 is set to the predetermined value RangeIn. When the hand wheel position 60 exceeds the predetermined threshold Angle1+ RangeIn, the range 70 is set to the predetermined value RangeOut and holds this value until the hand wheel position is again less than the predetermined threshold Angle1. In various embodiments, the range determination module 48 can use the transmission gear 68 to determine when the change in the range 70 should take place. For example, when the transmission is operating in reverse, the change of the range 70 between RangeIn and RangeOut occurs. When the transmission is operating in a forward gear, the range 70 remains set to RangeIn.

The angle determination module 46 receives as input the hand wheel position 60, the range 70, and the transmission gear 68. The angle determination module 46 determines the hand wheel angle 72 at which the gain begins to decrease from one to zero. In various embodiments, the angle 72 increases as the hand wheel position 60 rotates to the corners. Table 3 summarizes exemplary conditions for determining the updates to the angle 72.

TABLE 3

| Update Condition | Evaluation | Angle Update |
|---|---|---|
| Normal Operation | HW Position < Angle1 | Angle1 |
| Exit Region | HW Position < Angle − Delta AND Angle >= Angle1 + RangeIn − RangeOut | HW Position |
| Enter Region | HW Position > Angle + Range + Delta | HW Position − Range |

As shown in Table 3, when the hand wheel position 60 is less than the predetermined threshold Angle1, the angle 72 is reset to the predetermined threshold Angle1. When the hand wheel position 60 exceeds the angle 72 plus the range 70 plus a predetermined delta, the angle 72 is updated to the current hand wheel position 60 minus the range 70 (e.g., to indicate, for example the zero gain region.) In various embodiments, when the hand wheel position 60 is less than the angle 72 minus the predetermined delta and the angle 72 is greater than the predetermined threshold Angle1 plus the RangeIn minus the RangeOut, the angle 72 is updated to the hand wheel position 60 (e.g., to indicate a unity gain region).

In various embodiments, the angle determination module 46 can use the transmission gear 68 to determine when the change in angle 72 should take place. For example, when the transmission is operating in reverse, the change of the angle 72 occurs. When the transmission is operating in a forward gear, the angle 72 remains set to the predetermined threshold Angle1.

The gain determination module 52 receives as input the state 66, the hand wheel position 60, the angle 72, and the range 70. Based on the inputs, the gain determination module 52 determines a gain value 74. As will be discussed in more detail with regard to FIG. 3, the gain determination module 52 determines the gain 74 to be equal to one when the hand wheel position 60 reaches a first angle; and determines the gain 74 to be equal to zero when the hand wheel position 60 reaches a second angle. When the hand wheel position 60 is between the first angle and the second angle, the gain 74 can vary from one to zero. The first angle and the second angle are determined based on the angle 72 and the range 70. In various embodiments, the gain determination module 52 further applies a low pass filter to the gain 74. The cutoff frequency of the low pass filter is determined based on the state 66.

The damping determination module 54 receives as input the motor velocity 64, the hand wheel position 60, a hand wheel torque signal 76, and the hand wheel sign 61. Based on the inputs, the damping determination module 54 determines a damping value 78. As will be discussed in more detail with regard to FIG. 4, the damping determination module 54 determines the damping value 78 to be equal to zero when the hand wheel position 60 is outside of the end of travel region; and determines the damping value 78 to be equal to a non-zero value when the hand wheel position 60 is within the end of travel region.

The final assist command determination module 56 receives as input the gain 74, the damping 78, and a motor torque command 80. In various embodiments, the motor torque command 80 can be determined by other sub-modules within the control module 40. The final assist command determination module 56 applies the gain 74 and/or the damping 78 to the motor torque command 80 and generates a final assist command 82 based thereon. The final assist command 82 can be used to control the motor of the steering assist unit 18 (FIG. 1).

In one example, the final assist command determination module 56 applies the gain 74 to the motor torque command 80 to scale the motor torque command 80 near the end of travel region. In another example, the final assist command determination module 56 subtracts the damping 78 from the motor torque command 80. As can be appreciated, when both the gain 74 and the damping 78 are applied to the motor torque command 80, the damping 78 can be subtracted before or after the gain 74 is applied to the motor torque command 80.

Figure 4:
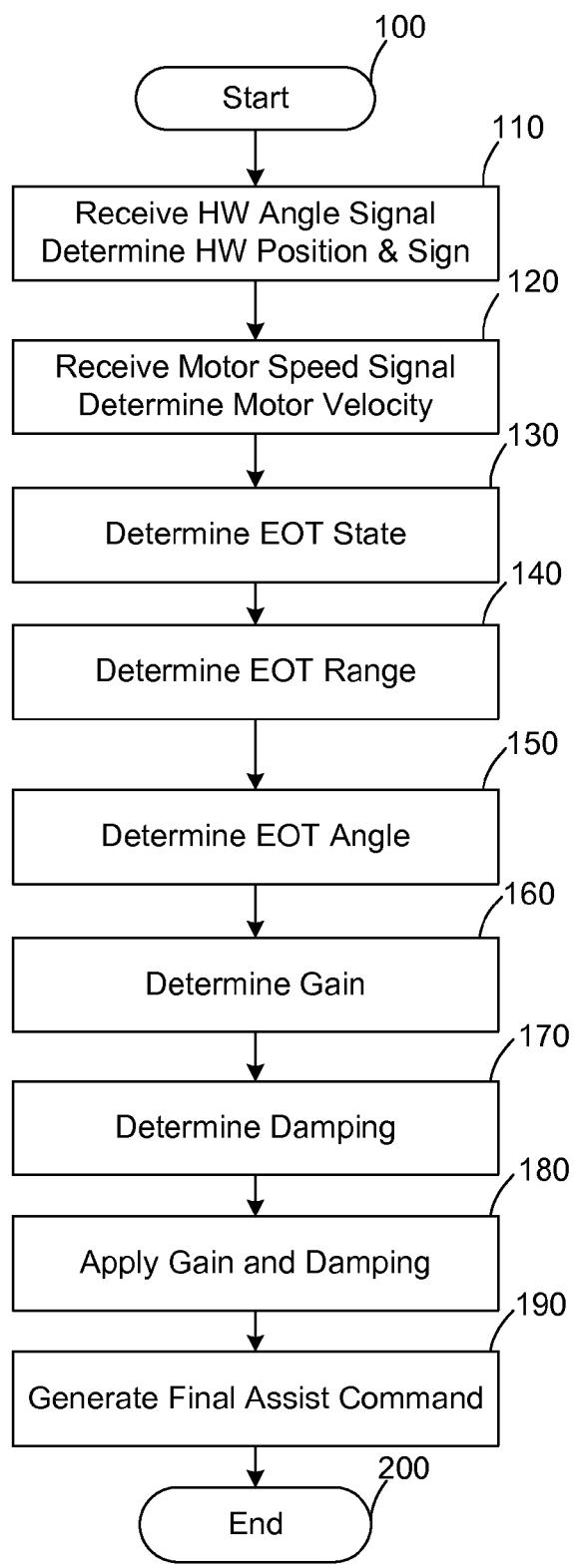
FIG. 4 is a flowchart illustrating a steering control method in accordance with the invention.

Referring now to FIG. 4 and with continued reference to FIG. 3, a flowchart illustrates a steering control method that can be performed by the control module 40 of FIG. 1. As can be appreciated in light of the disclosure, the order of operation within the method is not limited to the sequential execution as illustrated in FIG. 4, but may be performed in one or more varying orders as applicable and in accordance with the present disclosure.

As can be appreciated, the steering control method can be scheduled to run based on predetermined events and/or can run at scheduled intervals during operation of the vehicle 10 (FIG. 1).

In one example, the method may begin at 100. Pre-processing steps are performed at 110 to 140. For example, the hand wheel angle signal 58 is received and the hand wheel position 60 is determined based thereon at 110. Similarly, the motor speed signal 62 is received and the motor velocity 64 is determined based thereon at 120. The end of travel state 66 is determined based on the hand wheel position 60 and the motor velocity 64 at 130. The end of travel range 70 is determined based on the hand wheel position 60 and, in some cases, based on the transmission gear 68 at 140. The end of travel angle 72 is determined based on the hand wheel position 60, the end of travel range 70 and, in some cases, based on the transmission gear 68 at 150.

Figure 5:
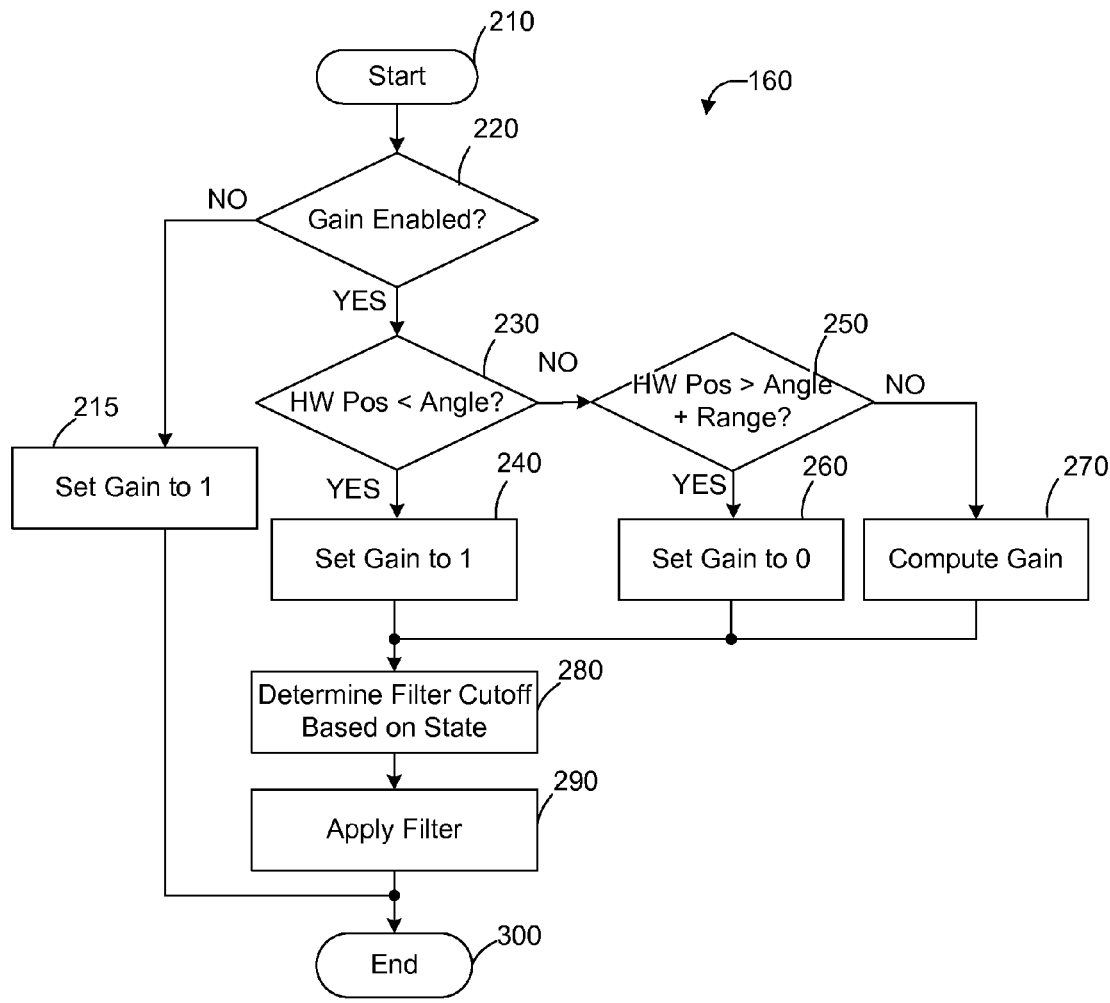
FIG. 5 is a flowchart illustrating a gain determination method in accordance with the invention.
Figure 6:
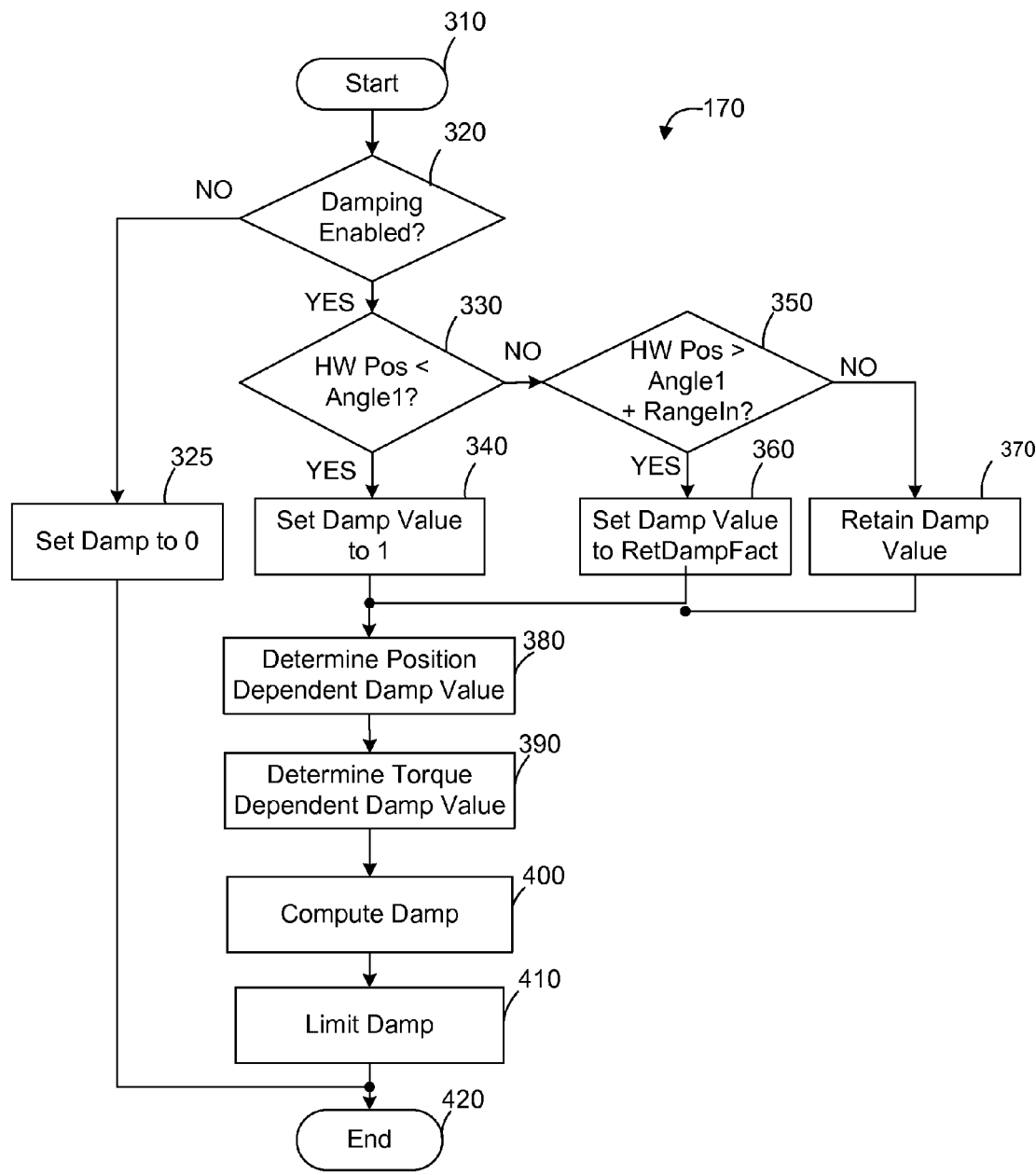
FIG. 6 is a flowchart illustrating a damping determination method in accordance with the invention.

Thereafter, the gain 74 is determined based on the hand wheel position 60, the state 66, the angle 72, and the range 70 at 160. As will be discussed in more detail below, FIG. 5 illustrates an example of determining the gain 74 that can be performed by the gain determination module 52. Additionally or alternatively, the damping 78 is determined based on the hand wheel torque 76, the motor velocity 64, the hand wheel position 60, and the hand wheel sign 61 at 170. As will be discussed in more detail below, FIG. 6 illustrates an example of determine the damping 78 that can be performed by the damping determination module 54.

At 180, the gain 74 and/or the damping 78 is then applied to the motor torque command 80. The final assist command 82 is then generated based thereon at 190 to control the motor of the steering assist unit 18 (FIG. 1). Thereafter, the method may end at 200.

Referring now to FIG. 5 and with continued reference to FIG. 3, a flowchart illustrates a gain determination method that can be performed by the control module 40 of FIG. 1. As can be appreciated in light of the disclosure, the order of operation within the method is not limited to the sequential execution as illustrated in FIG. 5, but may be performed in one or more varying orders as applicable and in accordance with the present disclosure.

In one example, the method may begin at 210. At 220, it is determined whether application of the gain 74 is desired. If the gain 74 is not desired or disabled at 220, the gain 74 is set to one at 225 and the method may end at 300.

Otherwise, if the gain 74 is desired thus, enabled at 220, the hand wheel position 60 is evaluated at 230 and 250. If the hand wheel position 60 is less than the end of travel angle 72 (outside of the end of travel region) at 230, the gain 74 is set to one at 240. Otherwise, if the hand wheel position 60 is greater than the angle 72 at 230, and the hand wheel position 60 is greater than the angle 72 plus the range 70 (within the end of travel region) at 250, the gain 74 is set to zero at 260. Otherwise, if the hand wheel position 60 is greater than the angle 72 at 230, and the hand wheel position 60 is less than the angle 72 plus the range 70 (exiting or entering the end of travel region) at 250, the gain 74 is computed based on the position within the range at 270. In one example, the gain 74 is computed based on the following equation:

$$\text{Gain} = (\text{Angle} + \text{Range} - HW\text{ Position})/\text{Range}.$$

As can be appreciated, other equations may be used to compute the gain 74.

Thereafter, at 280, the filter cutoff is determined based on the state 66. The appropriate filter is then determined based on the filter cutoff and applied to the gain 74 at 290. Thereafter, the method may end at 300.

Referring now to FIG. 6 and with continued reference to FIG. 3, a flowchart illustrates a damping determination method that can be performed by the control module 40 of FIG. 1. As can be appreciated in light of the disclosure, the order of operation within the method is not limited to the sequential execution as illustrated in FIG. 6, but may be performed in one or more varying orders as applicable and in accordance with the present disclosure.

In one example, the method may begin at 310. At 320, it is determined whether application of the damping 78 is desired. If the damping 82 is not desired or disabled at 320, the damping 78 is set to zero at 325 and the method may end at 420.

Otherwise, if the damping 78 is desired thus, enabled at 320, the hand wheel position 60 is evaluated at 330 and 350. If the hand wheel position 60 is less than the predetermined threshold Angle1 (outside of the end of travel region) at 330, a damping value is set to one at 340. Otherwise, if the hand wheel position 60 is greater than the predetermined threshold Angle1 at 330, and the hand wheel position 60 is greater than the predetermined threshold Angle1 plus the predetermined value RangeIn (within the end of travel region) at 350, the damping value is updated to a predetermined return damp factor at 360. In various embodiments, the return damp factor at 360 is a predetermined scaler value. In various other embodiments, the return damp factor at 360 is determined based on the hand wheel position 60, for example, using a lookup table. Otherwise, if the hand wheel position 60 is greater than the predetermined threshold Angle1 at 330, and the hand wheel position 60 is less than the predetermined threshold Angle1 plus the predetermined value RangeIn (exiting or entering the end of travel region) at 250, the damping value is retained at 370.

Thereafter, at 380, a position dependent damp value is optionally determined based on the hand wheel position 60, for example, using a lookup table. A torque dependent damp value at 390 is optionally determined based on the hand wheel torque 76, for example, using a lookup table at 390. The damping 78 is then computed at 400 by scaling the motor velocity 64 based on the damping value, the position dependent damp value, and/or the torque dependent damp value. In one example, the damping 78 is computed as a product of the motor velocity 64, the damping value, the position dependent damp value, and the torque dependent damp value. The computed damping 78 is then limited at 410 and the method may end at 420.

In various alternative embodiments (not shown in FIG. 6), the evaluation of the hand wheel position 60 at 330 and 350 can be replaced with an evaluation of the state 66. For example, when the state 66 indicates exit region or outside of the region, the damping value is set to the return damp factor. Otherwise, when the state 66 indicates enter region or hold within the region, the damping value is set to one.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A control system for controlling a steering system, the control system comprising:
    a first module that selectively determines a gain curve based on a position of a hand wheel of the steering system and a direction of movement of the hand wheel; and
    a second module that determines a motor assist command based on the gain curve.

2. The control system of claim 1 wherein the first module selectively determines the gain curve based on the position of the hand wheel relative to an end of travel region.

3. The control system of claim 1 further comprising a third module that selectively determines a gain value based on the gain curve, and wherein the second module determines the motor assist command based on the gain value.

4. The control system of claim 1 wherein the first module selectively determines the gain curve based on a hand wheel state.

5. The control system of claim 4 further comprising a fourth third module that determines the hand wheel state to be at least one of entering an end of travel region, exiting the end of travel region, operating within the end of travel region, and operating outside of the end of travel region based on the position of the hand wheel.

6. The control system of claim 1 wherein the first module selectively determines the gain curve based on a gear of a transmission.

7. A control system for controlling a steering system, the control system comprising:
    a first module that selectively determines a gain curve based on a position of a hand wheel of the steering system, wherein the first module selectively determines the gain curve from a plurality of dynamic gain curves; and
    a second module that determines a motor assist command based on the gain curve.

8. A control system for controlling a steering system, the control system comprising:
    a first module that selectively determines a gain curve based on a position of a hand wheel of the steering system, wherein the gain curve is defined by an angle and a range; and
    a second module that determines a motor assist command based on the gain curve.

9. The control system of claim 8 wherein the angle is dynamic.

10. The control system of claim 8 wherein the range is predefined.

11. A method of controlling a steering system, comprising:
    selectively determining a gain curve based on a position of a hand wheel of the steering system and a direction of movement of the hand wheel; and
    generating a motor assist command based on the gain curve.

12. The method of claim 11 wherein the selectively determining the gain curve is further based on the position of the hand wheel relative to an end of travel region.

13. The method of claim 11 further comprising selectively determining a gain value based on the gain curve, and wherein the determining the motor assist command is based on the gain value.

14. The method of claim 11 wherein the selectively determining the gain curve is based on a hand wheel state.

15. The method of claim 14 further comprising determining the hand wheel state to be at least one of entering an end of travel region, exiting the end of travel region, operating within the end of travel region, and operating outside of the end of travel region based on the position of the hand wheel.

16. The method of claim 11 wherein selectively determining the gain curve is further based on a gear of a transmission.

17. A method of controlling a steering system, comprising:
selectively determining main curve based on a position of a hand wheel of the steering system wherein the selectively determining the gain comprises selectively determining the gain curve from a plurality of dynamic gain curves; and
generating a motor assist command based on the gain curve.

* * * * *